US012762516B2

(12) United States Patent
Aggarwal et al.

(10) Patent No.: US 12,762,516 B2
(45) Date of Patent: Oct. 13, 2026

(54) ENVIRONMENTAL IMPACT AWARE PRODUCT REFURBISHING

(71) Applicant: International Business Machines Corporation, Armonk, NY (US)

(72) Inventors: Nupur Aggarwal, Bangalore (IN); Sumanta Mukherjee, Bangalore (IN); Vijay Ekambaram, Chennai (IN); Vikas C. Raykar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 17/379,580

(22) Filed: Jul. 19, 2021

(65) Prior Publication Data

US 2023/0012650 A1 Jan. 19, 2023

(51) Int. Cl.
*G06Q 10/30* (2023.01)
*G06N 20/00* (2019.01)
(Continued)

(52) U.S. Cl.
CPC ............. *G06Q 10/30* (2013.01); *G06N 20/00* (2019.01); *G06Q 10/087* (2013.01); (Continued)

(58) Field of Classification Search
CPC .. G06Q 10/30; G06Q 10/087; G06Q 30/0205; G06Q 30/0206; G06N 20/00
See application file for complete search history.

(56) References Cited

U.S. PATENT DOCUMENTS 11,853,917 B2 * 12/2023 Aggarwal ............ G06Q 10/087
12,248,872 B1 * 3/2025 Beniwal .................. G06F 18/21
(Continued)

FOREIGN PATENT DOCUMENTS

WO WO-2021156835 A1 * 8/2021 ............. G06Q 10/04

OTHER PUBLICATIONS

Ghoreishi, Malahat & Happonen, Ari. (2019). New Promises AI Brings into Circular Economy Accelerated Product Design: Review on Supporting Literature (Year: 2019).*
(Continued)

*Primary Examiner* — Beth V Boswell
(74) *Attorney, Agent, or Firm* — Ryan, Mason & Lewis, LLP

(57) ABSTRACT

Methods, systems, and computer program products for environmental impact aware product refurbishing are provided herein. A computer-implemented method includes obtaining information for products comprising images of the products and location-specific demand data; determining product embeddings of the products based on the images, wherein each of the product embeddings encodes attributes of the corresponding product; creating one or more refurbished designs of each given one of the products based on the initial image of the given product and one or more design constraints; calculating an environmental impact score and a demand impact score associated with each of the created refurbished designs, wherein the demand impact score is based on the location-specific demand data; generating a recommendation to refurbish at least one of the products in accordance with at least one of the refurbished designs based on the environmental impact scores and the demand impact scores.

20 Claims, 9 Drawing Sheets

(51) Int. Cl.
*G06Q 10/087* (2023.01)
*G06Q 30/0201* (2023.01)
*G06Q 30/0204* (2023.01)
*G06T 7/70* (2017.01)

(52) U.S. Cl.
CPC ..... *G06Q 30/0205* (2013.01); *G06Q 30/0206* (2013.01); *G06T 7/70* (2017.01)

(56) References Cited

U.S. PATENT DOCUMENTS

| | | | | |
|---|---|---|---|---|
| 2007/0226155 | A1 | 9/2007 | Yu et al. | |
| 2018/0039958 | A1 | 2/2018 | Bryant et al. | |
| 2019/0019147 | A1 | 1/2019 | McCarty et al. | |
| 2019/0370837 | A1 | 12/2019 | Shamiss et al. | |
| 2020/0126027 | A1 | 4/2020 | Mahajan et al. | |
| 2022/0383396 | A1* | 12/2022 | Haapoja | G06Q 30/0639 |

OTHER PUBLICATIONS

New promises AI brings into circular economy accelerated product design: a review on supporting literature (Year: 2019).*

Fashion Upcycling _ An Avant-Garde View, https://barbaraigongini.com/universe/blog/fashion-upcycling/, Feb. 15, 2019, last accessed Jul. 19, 2021.

“Refurbishment”, Nike, Inc., available at https://www.nikecirculardesign.com/refurbishment, last accessed Jul. 19, 2021.

Adele Peters, “Patagonia Wants To Refurbish Your Old Clothes And Sell Them To Someone Else”, Fast Company, Jan. 27, 17, available at https://www.fastcompany.com/3067443/patagonia-wants-to-refurbish-your-old-clothes-and-sell-them-to-someone-else, last accessed Jul. 19, 2021.

Sara Radin, “What’s Behind the Rise of Upcycled Garments?” published Jan. 16, 2019, available at https://fashionista.com/2019/01/upcycled-clothing-sustainable-fashion-trend, last accessed Jul. 19, 2021.

Mall, Utkarsh, et al. “Geostyle: Discovering fashion trends and events.” Proceedings of the IEEE/CVF International Conference on Computer Vision. 2019.

T-Fashion, available at https://tfashion.ai/, last accessed Jul. 19, 2021.

Stylumia, available at https://www.stylumia.ai/, Stylumia Intelligence Technology Pvt Ltd, last accessed Jul. 19, 2021.

B-Stock Editorial Team, “How refurbished clothes could become a thing”, Jun. 22, 2018, available at https://bstock.com/blog/how-refurbished-clothes-could-become-a-thing/, last accessed Jul. 19, 2021.

Zhu S, Urtasun R, Fidler S, Lin D, Change Loy C. Be your own prada: Fashion synthesis with structural coherence. InProceedings of the IEEE international conference on computer vision 2017 (pp. 1680-1688).

Yuan, Chenxi, and Mohsen Moghaddam. “Garment Design with Generative Adversarial Networks.” arXiv preprint arXiv:2007.10947 (2020).

Cheng, Yu, et al. “Sequential attention GAN for interactive image editing.” Proceedings of the 28th ACM International Conference on Multimedia. 2020.

Martins, Vitor William Batista, et al. “Knowledge management in the context of sustainability: Literature review and opportunities for future research.” Journal of cleaner production 229 (2019): 489-500.

Mell, Peter, et al., The NIST Definition of Cloud Computing, National Institute of Standards and Technology, U.S. Department of Commerce, NIST Special Publication 800-145, Sep. 2011.

* cited by examiner

ENVIRONMENTAL IMPACT AWARE PRODUCT REFURBISHING

BACKGROUND

The present application generally relates to information technology and, more particularly, to artificial intelligence techniques for product refurbishing.

Businesses frequently are unable to sell all of their product inventory. For example, in the fashion industry, it is common for businesses to sell roughly half of their inventory. Various strategies are used to reduce unsold inventory, such as offering significant discounts, burning the remaining inventory, or transporting it to landfills, for example.

SUMMARY

In one embodiment of the present disclosure, techniques for environmental impact aware product refurbishing are provided. An exemplary computer-implemented method includes obtaining information for a plurality of products, wherein the information comprises images of the plurality of products and location-specific demand data; determining, using a machine learning framework, product embeddings of the plurality of products based on the images, wherein each of the product embeddings encodes attributes of the corresponding product; creating, using the machine learning framework, one or more refurbished designs of each given one of the plurality of products based on the initial image of the given product and one or more design constraints; calculating, by the machine learning framework, an environmental impact score and a demand impact score associated with each of the created refurbished designs, wherein the demand impact score is based at least in part on the location-specific demand data; generating, by the machine learning framework, a recommendation to refurbish at least one of the plurality of products in accordance with at least one of the refurbished designs based on the environmental impact scores and the demand impact scores; and outputting the recommendation and an image of the refurbished design corresponding to the recommendation to a user.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Refurbishing products can be an efficient and environmentally friendly way to reduce unsold inventory. However, refurbishing products presents many challenges because, for example, product disposal techniques and the associated costs depend on the location and the type of product. Such challenges include determining whether there will be a return on the investment for refurbishing the product, determining the environmental impact of refurbishing the product, and determining whether to make the same refurbishing decisions across different geographical locations. Trivial approaches to select products for refurbishing may not positively impact revenue and/or sustainability.

As described herein, an exemplary embodiment includes an artificial intelligence-based system that is configured to discover products and refurbishing schemes for products in unsold inventory. At least one embodiment includes discovering a subset of products in unsold inventory (e.g., the top-k products) for refurbishing along with trendy and sustainable edit schemes, wherein the subset is optimized with respect to environmental impact and/or company revenue. Some example embodiments employ actionability guided counterfactual explanation to produce a ranked list of refurbished products. Such embodiments may incorporate expert knowledge and produce feasible suggestions that factor in both salability and refurbishment cost.

Some example embodiments include generating product embeddings (e.g., vector representations) of a product using a variational autoencoder framework, which enables, for example, new refurbished product designs to be generated via vector operations. Additionally, the product embeddings may be jointly trained using demand and/or sales data with respect to specific locations. The product embeddings may then be used to generate location-specific product sales forecasts. Regression on the product embedding space enables forecasts to be created even for new refurbished product designs.

Some example embodiments implement an algorithmic product design process that derives new refurbished product designs to increase sales, for example, based on the product embeddings and sales forecasting. Generally, the algorithmic product design process is provided input in the form of a product embedding and one or more product design constraints. A counterfactual engine is also provided that performs constraint-based optimization, where the constraints are driven by domain knowledge. The constraint-based optimization is carried out in the vector embedding space, and the counterfactual engine checks for constraint violations using a decoder framework and a product attribution network. The counterfactual engine, in some embodiments, connects the cost of product upcycle, sales profit, and improved sustainability as an objective function to produce one or more suggested optimized upcycle modifications.

Figure 1:
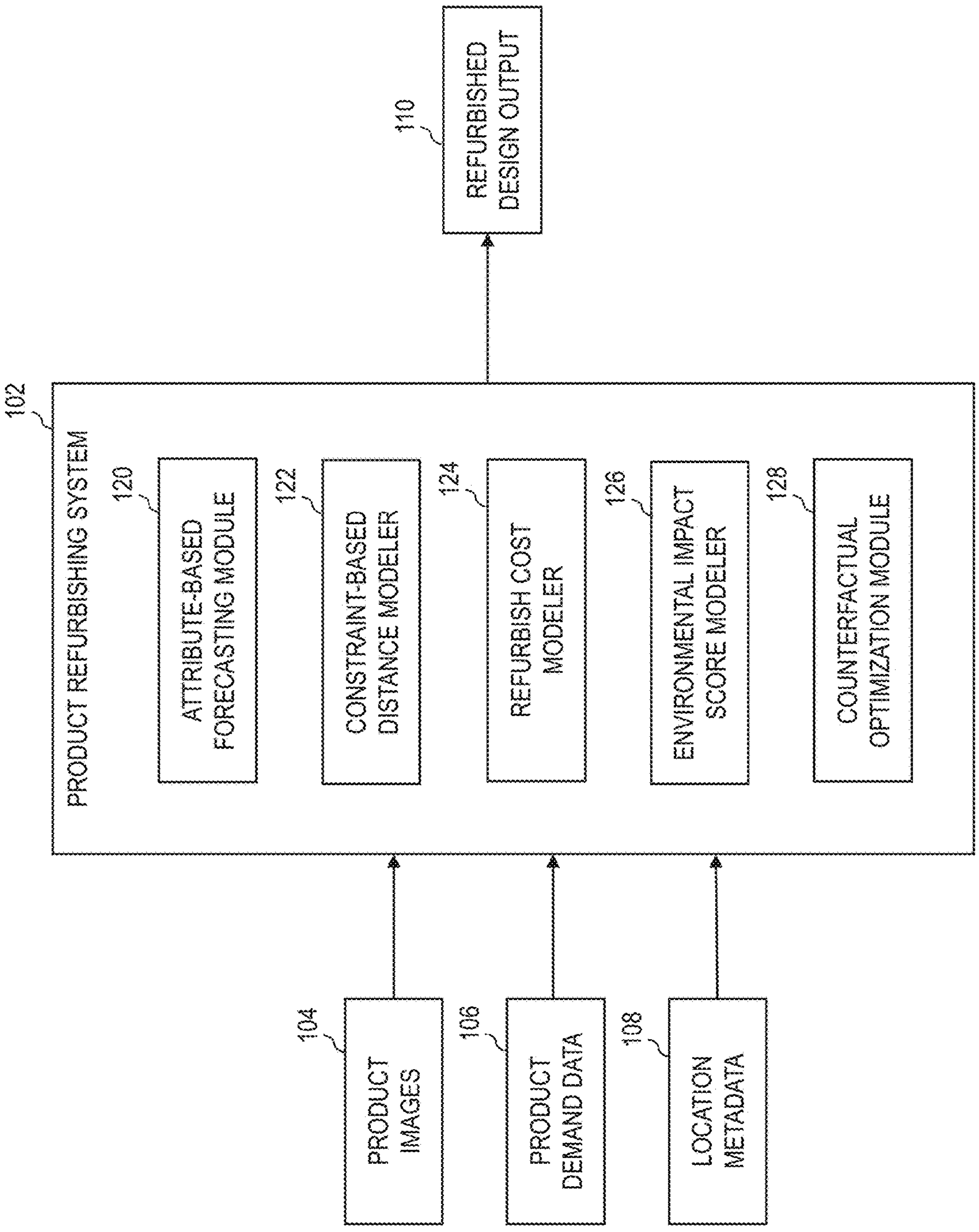
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a product refurbishing system 102 which obtains one or more product images 104, product demand data 106, and location metadata 108 as input. In the FIG. 1 embodiment, the product refurbishing system 102 includes an attribute-based forecasting module 120, a constraint-based distance modeler 122, a refurbish cost modeler 124, an environmental impact score modeler 126, and a counterfactual optimization module 128. The product refurbishing system 102 may use such components to generate refurbished design output 110, as described in more detail herein.

The attribute-based forecasting module 120 may use attributes of a particular group of products (e.g., corresponding to product images 104) to forecast future demand more accurately at a SKU level, for example. As an example, the attribute-based forecasting module 120 may implement hyperlocal forecasting artificial intelligence techniques that consider the context of each demand driver (e.g., influential factor) within each individual location in order to generate accurate demand forecasts on a granular level.

Generally, the attribute-based forecasting module 120 captures both product attributes and the location metadata 108 (which may include store location information, for example) in the forecasting model, thus providing a robust forecasting estimation. As described herein, a change to a product is typically represented as change one or more attributes of the product, and the attribute-based forecasting module 120 can evaluate a change in the sales and/or demand resulting from the adoption of the attribute change. The attribute-based forecasting module 120, in some embodiments, is generalized to use vector embeddings of the product images 104, where each embedding is jointly trained with the product demand data 106 and the location metadata 108. As such, the attribute-based forecasting module 120 allows the product refurbishing system 102 to capture the effect of subtle features to sales, which is otherwise difficult to represent as a discrete feature.

As an example, the attribute-based forecasting module 120 may implement an artificial intelligence framework that uses product information data as training data, such as product images 104, product demand data 106, and location metadata 108, for example. The artificial intelligence framework may include an autoencoder component to generate the product embeddings (e.g., the vector representation of the products), and a forecasting engine (e.g., one or more deep sequential models). This provides a scalable framework that automatically discovers the sales driven product embeddings of products. In at least some examples, the autoencoder framework may be implemented as a generative adversarial network (GAN) or a variational autoencoder (VAE), for example. This allows the autoencoder framework to output a reconstructed image of a product in response to a product embedding provided as input. Accordingly, the attribute-based forecasting module 120 may be used for new product designs, including new refurbished product designs, for example. Incorporating a location representation for products is an important factor for generating accurate hyper local forecasts. As such, the attribute-based forecasting module 120 may incorporate local buying capacity and local trend information in the location representation in the product embedding for a given product, along with a geospatial location.

The product embeddings generated by the attribute-based forecasting module 120 do not explicitly model explainable discrete attributes. As an example, refurbishing a t-shirt generally should not include changes to the type of fabric or changing a dark base color to a light color. These restrictions are explainable and can be represented as restriction rules in terms of the product attributes. The constraint-based distance modeler 122 includes an attribution layer that works on the product images 104 to enable design restriction on discrete attributes. The constraint-based distance modeler 122 can obtain a reconstructed image (e.g., from the decoder of the autoencoder framework) and generate an associated attribution. In at least one example embodiment, the attribution layer is separately trained as it does not need to consider the product demand data 106 and the location metadata 108.

Figure 2:
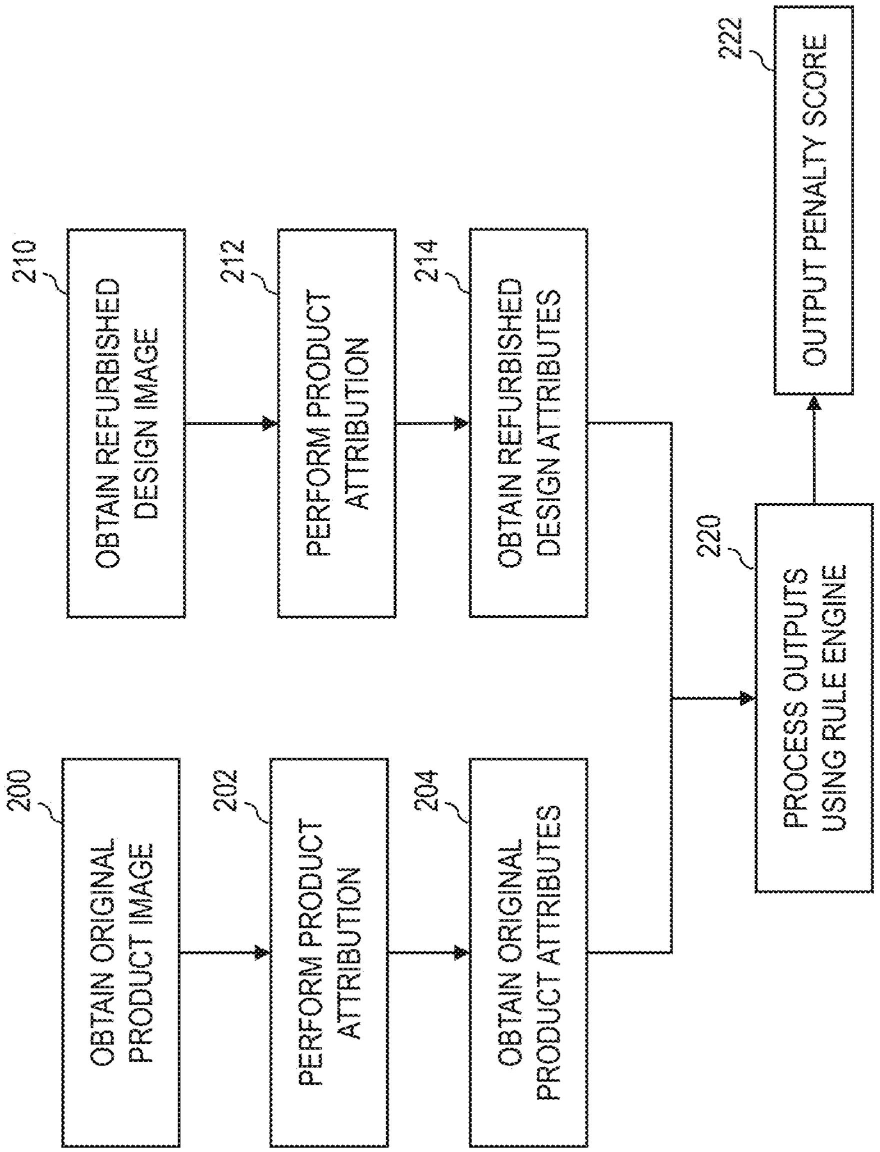
FIG. 2 is a diagram illustrating a constraint-based distance modeling process in accordance with exemplary embodiments.

Referring also to FIG. 2, this figure shows an example of a constraint-based distance modeling process in accordance with exemplary embodiments. The process depicted in FIG. 2 is assumed to be performed at least in part by the constraint-based distance modeler 122. Step 200 includes obtaining an original product image. Step 202 of the process includes performing product attribution on the original product image, and step 204 includes obtaining the original product attributes as output. In a similar manner, step 210 includes obtaining a refurbished design image, step 212 includes performing product attribution on the refurbished design image, and step 214 includes obtaining the refurbished design attributes as output. Step 220 includes processing the outputs obtained from steps 204 and 214 using a rule engine. Generally, the rule engine performs design feasibility checks based on a set of design rules, and step 222 outputs a penalty score. Any infeasible attribution change incurs a high penalty score (e.g., changing a dark base color of a t-shirt to a light color would incur a high penalty score). As such, the penalty score may be considered a distance metric of the refurbished design from the original product.

The refurbish cost modeler 124 determines product attribute and trend forecast based pricing strategies. It is to be appreciated to those skilled in the art that various techniques may be used for determining such strategies. As an example, the refurbish cost modeler 124 may define sellable products and extended attributes for such products. The extended attributes may include additional information or selectable options corresponding to a given product (e.g., a shirt may have extended attributes including color).

In addition to defining sellable products and extended attributes, in one embodiment pricing administrators are enabled to define price lists for the sellable products. Each price list defines prices for all or subset of the products. Furthermore, each product can have different prices under different price lists. The pricing administrator(s) may also define pricing for specific products based on the base price of each product and extended attributes that are applicable to the products. As such, at least one embodiment includes defining sellable objects, which include one or more products that are collectively offered for sale via a single transaction (such as a quote, order, shopping cart, etc.). A particular price list may be selected based on the region and the type of product, for example. The prices of the products that make up a sellable object are determined based on the chosen price list, the particular products, and extended attribute selections for those products. Data pertaining to product descriptions, extended attribute descriptions, and corresponding pricing information may be stored in a database to enable users to build sellable objects using, for example, user interface forms.

Accordingly, the refurbish cost modeler 124 may determine the market value of the refurbished design product and adjust it to increase net revenue. The product pricing may also consider local product demand and projected sales over a period time when increasing the net revenue. In some embodiments, the refurbish cost modeler 124 accounts for the manufacturing and/or alteration costs. Such costs may be based on the local market, batch size, and relevant contracts, for example. In some embodiments, the refurbish cost modeler 124 is implemented separately from system 102.

The environmental impact score modeler 126 may implement an ontology-based discovery approach for determining the environmental impact for different refurbishing options. The ontology-based discovery sustainability approach may include, for example, taxonomy construction, ontology construction, and knowledge systematization for performing the sustainability evaluation. In at least some example embodiments, the environmental impact score modeler 126 can account for differences in how a given product can be refurbished. As an example, for clothing, the environmental impact score modeler 126 can account for the fact that different ways of manufacturing the same fabric result in different environmental impacts. In at least one example embodiment, the environmental impact score modeler 126 uses the Higg Index, which is an index that gives sustainability scores by taking input information about various stages that were involved in fabric manufacturing. The Higg Index is based on 1 Kg of the fabric. Since many garments are blended fabrics, one or more embodiments may take a weighted average of the Higg index of the fabrics present in the garment. The weighted average is then normalized by the weight of the garment. To calculate a sustainability score for a collection of products, a weighted average of the Higg Index of the products in the collection may be used. Similar techniques may be used for other types of products.

The counterfactual optimization module 128 provides model specific explanations for minimum changes that lead to a significant change in model output. For example, the counterfactual optimization module 128 may indicate the differences between an initial product and a refurbished design option for the product that will impact the refurbished design output. In some example embodiments, the counterfactual optimization module 128 may be implemented as a search process that utilizes the attribute-based forecasting module 120, the constraint-based distance modeler 122, the refurbish cost modeler 124, and the environmental impact score modeler 126. The result of the search process is typically multi-objective with respect to increasing revenue over a specified time horizon and obtaining a higher sustainability score. The counterfactual optimization module 128 may generate a ranked list of refurbished designs using population-based search algorithms (such as NSGA-II, for example).

Figure 3:
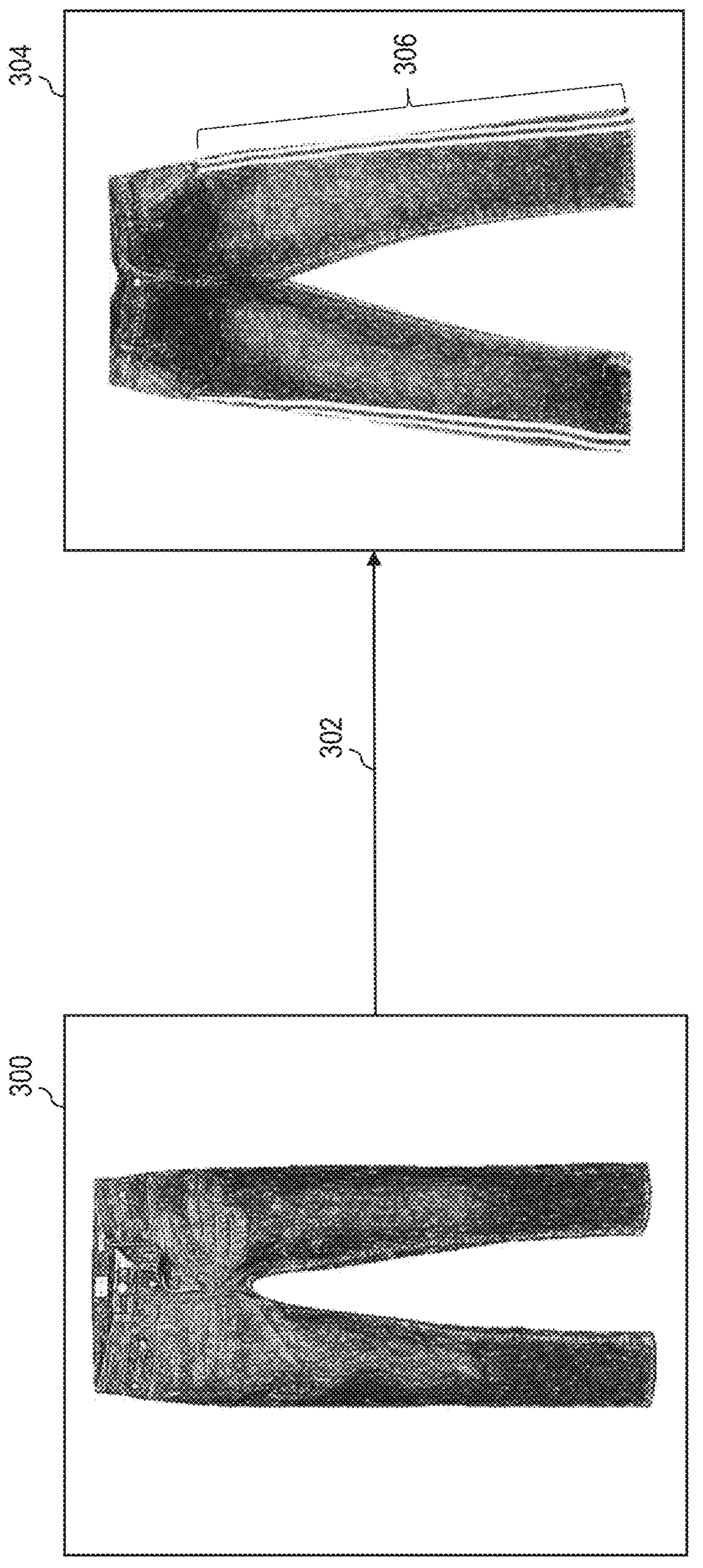
FIG. 3 is a diagram illustrating a counterfactual formulation process in accordance with exemplary embodiments.

Referring also to FIG. 3, this figure shows a counterfactual formulation process in accordance with exemplary embodiments. In the FIG. 3 example, the counterfactual formulation process 302 is performed with respect to an image of a first product 300 and an image of a refurbished product 304. As can be seen from FIG. 3, the refurbished product 304 includes some modifications 306 relative to product 300. FIG. 3 also shows information associated with products 300 and 304. Assume product 300 is denoted as:

Product: P

Location: x

Projected Sales: $s_t(P|x)$

Inventory at a specified time: $I_\infty(P)$

Also assume that refurbished product 304 is denoted as:

Product: P+ΔP

Location: x

Projected Sales: $s_t(P+\Delta P|x)$

Inventory @ specified time: $I_\infty(P+\Delta P)$

The counterfactual formulation process may include computing a cost to refurbish the product 300 to the product 304, which can be given by the following equation:

$$\text{Cost: } c_x(P+\Delta P|P)=c_{transport}+c_{fabrication}$$

The increased sales and the sustainability factor may be calculated as:

$$\text{Increased Sales: } \Delta s=(s_t(P+\Delta P|x)-s_t(P|x))$$

$$\text{Sustainability factor: } \Delta I=\phi(I_\infty(P+\Delta P)-I_\infty(P)),\text{ where}$$

$\phi$ is the Higgs index variable.

The total savings may be calculated as:

$$\text{Total Saving: } \int \Delta s_t dt-c_x+\Delta I$$

The counterfactual formulation process 302 may then determine the counterfactual as:

$$\text{Perform Counter factual: } \min_{\Delta P}\max_{\lambda}\lambda\left(\int \Delta s_t(\Delta p\,|\,x)dt+\Delta I(\Delta p)\right)-c_x(\Delta p)$$

In one embodiment, the counterfactual optimization module 128 performs this process for each possible refurbished design option.

Figure 4:
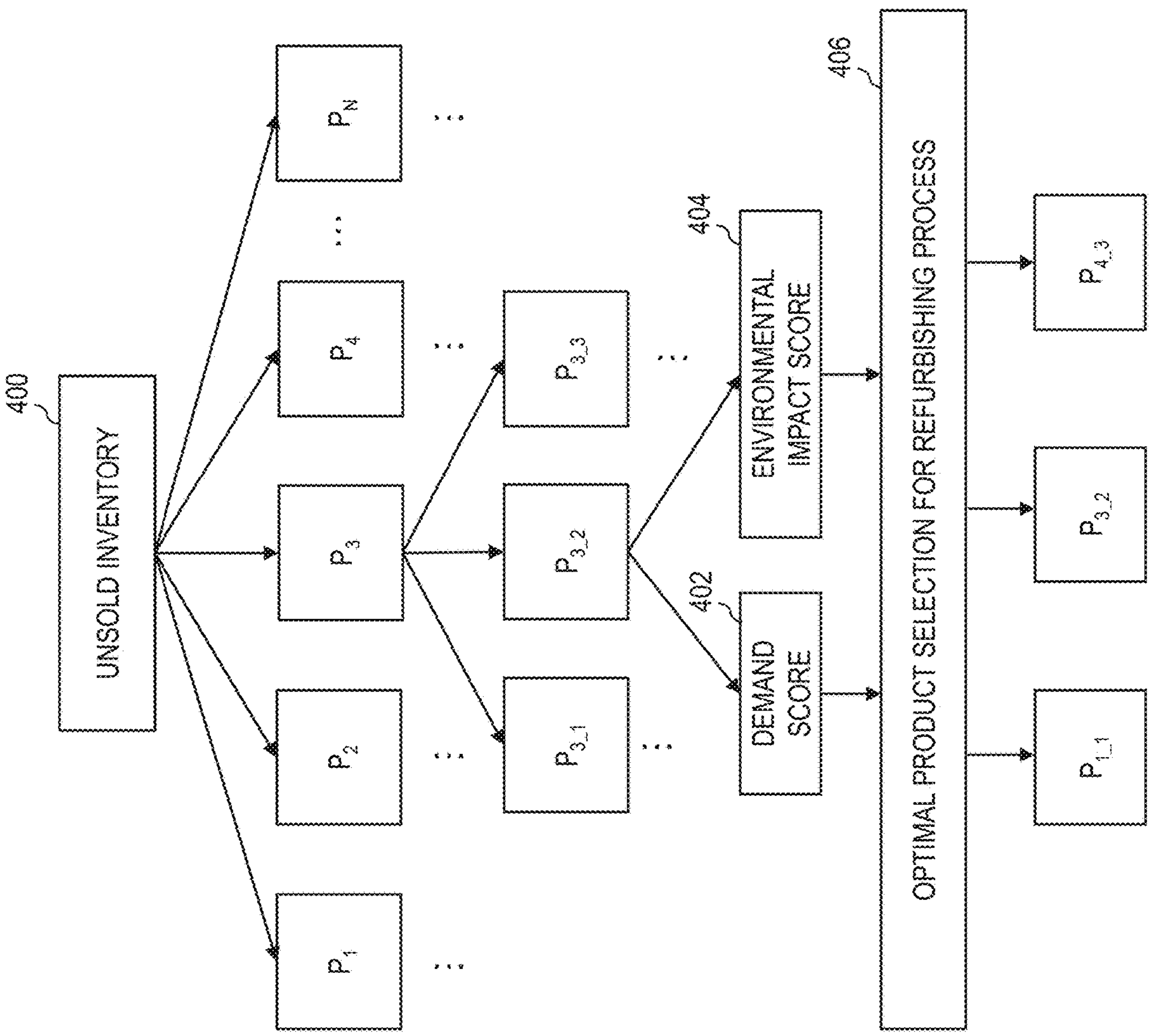
FIG. 4 is a flow diagram for selecting optimal products from unsold inventory in accordance with exemplary embodiments.

Referring also to FIG. 4, this figure shows a flow diagram for selecting optimal products from unsold inventory in accordance with exemplary embodiments. In this example, the unsold inventory 400 includes products $P_1, P_2, \ldots, P_N$. For each of these products, multiple candidate edit schemes can be determined along with a respective demand score 402 and environmental impact score 404 for each of the candidates. In FIG. 4, the candidate edit schemes for $P_3$ are represented as $P_{3\_1}$, $P_{3\_2}$, and $P_{3\_3}$. An optimal product selection for refurbishing process 406 is performed to choose the right subset of products and candidate edit schemes to increase both the demand and environmental impact scores 402, 404. In the FIG. 4 example, this subset includes $P_{1\_1}$, $P_{3\_2}$, and $P_{4\_3}$.

The counterfactual optimization module 128, in at least one embodiment, produces multiple refurbishment options for each product being considered. For example, assume a given set, $k_i$, represents the number of refurbish design options for product i. The refurbishment options of the product i are denoted as $p_{i,1}, p_{i,2}, \ldots p_{i,k_i}$, and the unsold inventory for product i is denoted as $I_i$. The various design costs associated with the different refurbishment options (e.g., demand, associated cost, carbon footprint, etc.) are represented as $$\{d_{i,1}^1, d_{i,2}^2, \ldots d_{i,k_i}^{k_i}\}.$$

It is noted that each refurbishment design is generated using the counterfactual optimization module 128, while assuring improved demand and reduced environmental impact. The counterfactual optimization module 128 may then decide the top k refurbishment options for a large group based on, for example, budget constraints and environmental impact constraints. The problem of selecting the right subset can be formulated as a linear programming problem, with the hierarchical compositional constraints. For example, let $$d_{i,j}^{cost},\ d_{i,j}^{carbon},\ d_{i,j}^{demand}$$

be the manufacturing cost, environmental impact (e.g., carbon footprint), and demand associated with the $j^{th}$ refurbishment option of product i. Then, the subset may be selected based on the following:

$$\max_{\delta} \delta_{i,j} I_i d_{i,j}^{demand} \text{ subjected to:}$$

$$\sum_i \sum_j \delta_{i,j} \leq k \text{ (}k\text{ subset selection)}$$

$$1 \geq \delta_{i,j} \geq 0$$

$$\sum_j \delta_{i,j} \leq 1 \text{ (one refurbishment option selection)}$$

$$\sum_i \sum_j \delta_{i,j} d_{i,j}^{cost} I_i \leq B \text{ (Budget Constraint)}$$

$$\sum_i \sum_j \delta_{i,j} d_{i,j}^{carbon} I_i \leq C \text{ (Enviromental Impact Constraint)}$$

Figure 5:
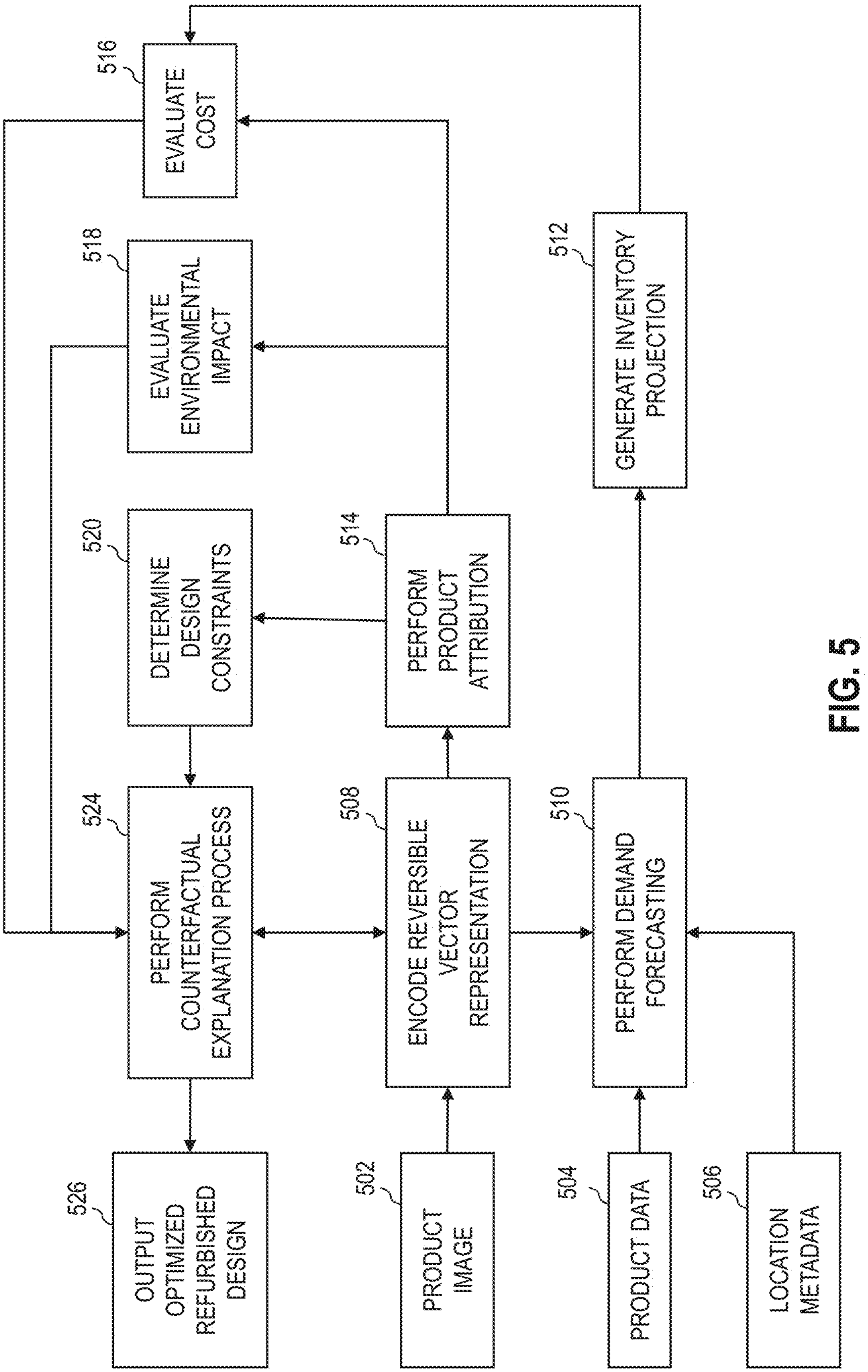
FIG. 5 is a flow diagram illustrating environmental impact aware product refurbishing techniques in accordance with exemplary embodiments.

FIG. 5 is a flow diagram illustrating environmental impact aware product refurbishing techniques in accordance with exemplary embodiments. Step 508 includes encoding a reversible vector representation for a product image 502.

Step 524 includes performing a counterfactual explanation process based on the vector representation generated at step 508. The counterfactual explanation process may then determine multiple candidate edit schemes of the product corresponding to product image 502, and the candidate edit schemes may be encoded as reversible vector representation at step 508.

Step 510 includes performing product attribution based on the reversible vector representations. For example, step 510 may include using a decoder to create images corresponding to the reversible vector representation and analyzing the images to determine corresponding sets of attributes.

Step 520 includes determining one or more design constraints with respect to the sets of attributes generated at step 514. The constraints may be specified by subject matter experts to restrict the types of designs that should be considered.

Additionally, step 510 includes performing demand forecasting based on product data 504, location metadata 506 (e.g., the locations of multiple stores), and the reversible vector representations generated at step 508. The product data 504 includes, for example, sales and inventory data pertaining to the product corresponding to the product image 502. In some examples, the demand forecasting in step 510 may generate a sales forecast and/or inventory forecast for individual stores identified in the location metadata 506. Step 512 includes generating projected inventory forecasts for the stores. It is noted that projected inventory forecasts may be specified for particular time periods (e.g., end of a season).

Steps 516 and 518 evaluate cost and environmental impact, respectively, for the different candidate edit schemes using the techniques that are described in more detail elsewhere herein. The counterfactual explanation process of step 524 uses the results of steps 516 and 518 (such as, for example, sustainability scores and/or costs determined for the various candidate edit schemes) to select an optimized refurbished design for the product, which is output at step 526.

As noted herein, the product refurbishing system 102, in some embodiments, utilizes one or more artificial intelligence models, including, for example, an autoencoder model (e.g., a GAN model and/or a VAE model) to generate product embeddings and to reconstruct images from product embeddings. It is to be appreciated that "model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. For example, one or more of the models described herein may be trained and/or generate predictions based on at least a portion of the data corresponding to product images 104, product demand data 106, and/or location metadata 108, for example.

Figure 6:
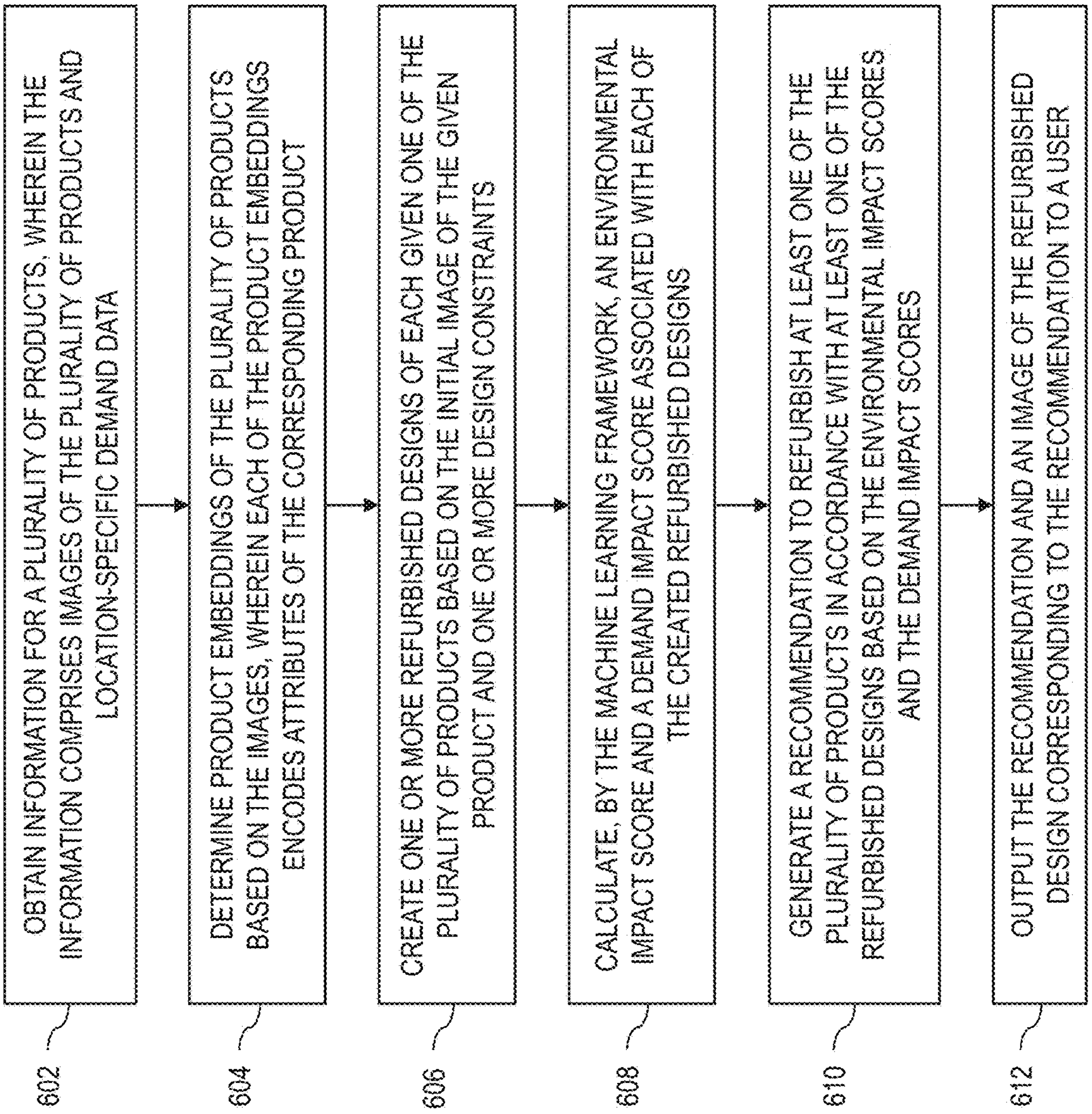
FIG. 6 is a flow diagram illustrating techniques in accordance with exemplary embodiments.

FIG. 6 is a flow diagram illustrating techniques in accordance with exemplary embodiments. Step 602 includes obtaining information for a plurality of products, wherein the information comprises images of the plurality of products and location-specific demand data. Step 604 includes determining, using a machine learning framework, product embeddings of the plurality of products based on the images, wherein each of the product embeddings encodes attributes of the corresponding product. Step 606 includes creating, using the machine learning framework, one or more refurbished designs of each given one of the plurality of products based on the initial image of the given product and one or more design constraints. Step 608 includes calculating, by the machine learning framework, an environmental impact score and a demand impact score associated with each of the created refurbished designs, wherein the demand impact score is based at least in part on the location-specific demand data. Step 610 includes generating, by the machine learning framework, a recommendation to refurbish at least one of the plurality of products in accordance with at least one of the refurbished designs based on the environmental impact scores and the demand impact scores. Step 612 includes outputting the recommendation and an image of the refurbished design corresponding to the recommendation to a user.

Calculating the environmental impact score for a given one of the refurbished designs may be based on at least one of: one or more materials associated with refurbishing the corresponding product to the given refurbished design; and one or more manufacturing techniques associated with refurbishing the corresponding product to the given refurbished design. Calculating the demand impact score for a given one of the refurbished designs may be based on at least one of: a predicted demand of given refurbished design; and a cost associated with the refurbished design. The product embeddings are jointly trained with the location-specific demand data. The process may further include the step of generating attribute-based, location-specific demand forecasts for the products using the jointly trained product embeddings, wherein the one or more refurbished designs are created based at least in part on the attribute-based, location-specific demand forecasts. The process may further include the step of determining a feasibility of a given one of the refurbished designs associated with a corresponding one of the products by applying one or more design rules to calculate a distance score between the attributes of the corresponding product and attributes of the given refurbished design. The generating may include: ranking the refurbished designs for all of the products based on the environmental impact scores and the demand impact scores; and selecting a subset of the plurality of products to include in the recommendation based on said ranking. The one or more refurbished designs may be created based at least in part on an autoencoder process of the machine learning framework. The autoencoder process may include utilizing a generative adversarial network.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
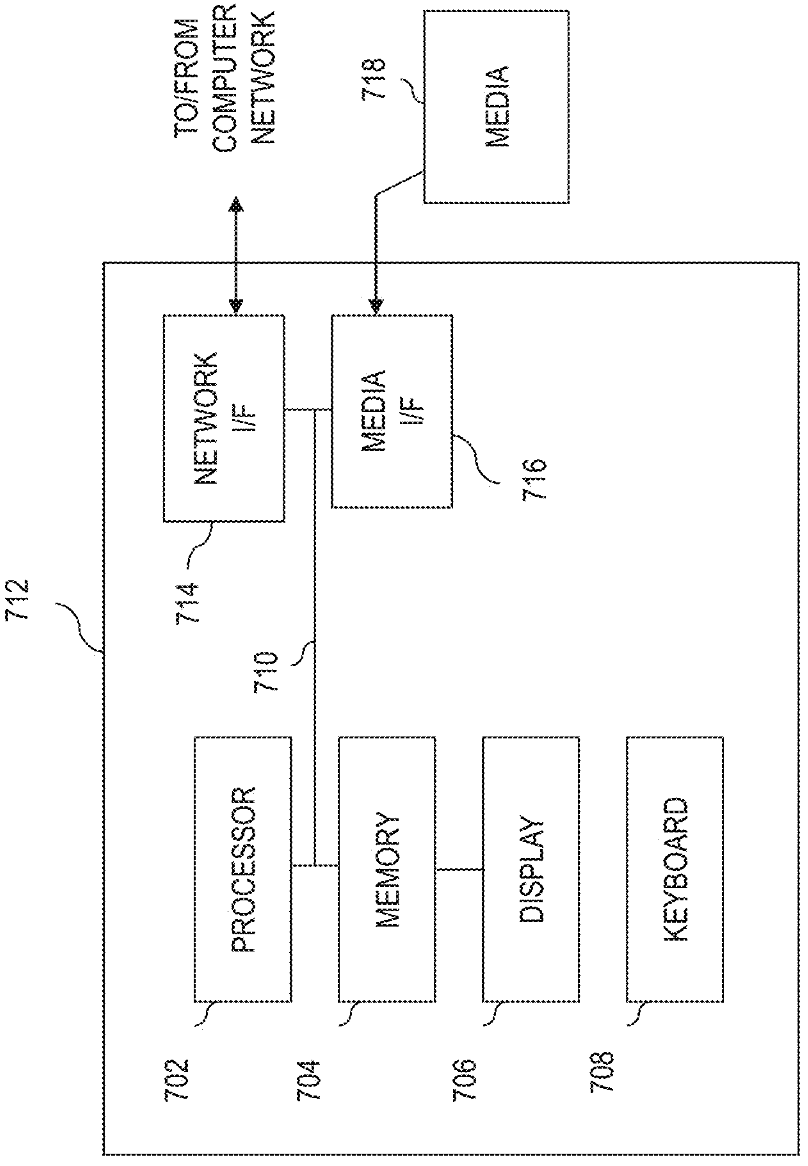
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
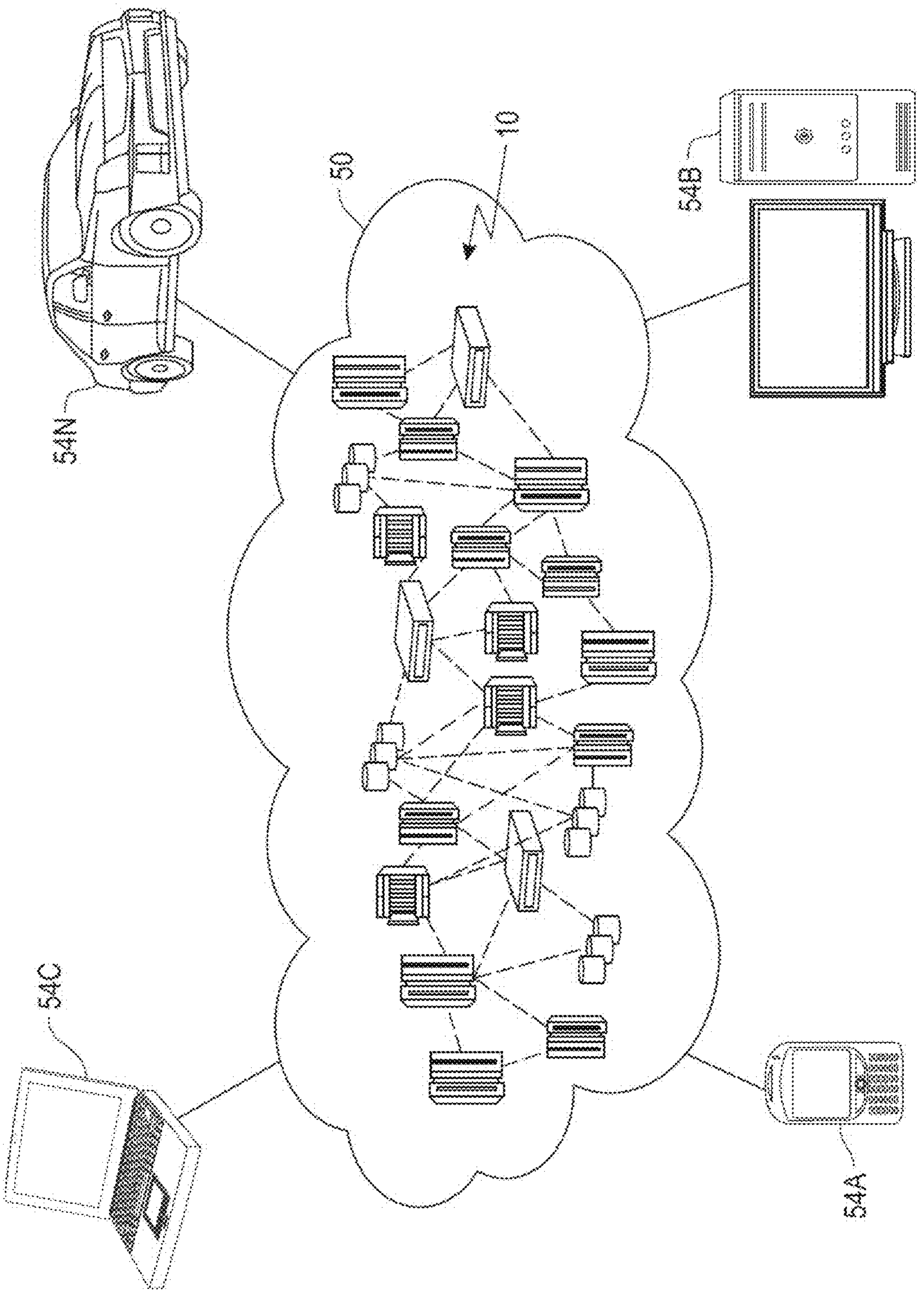
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
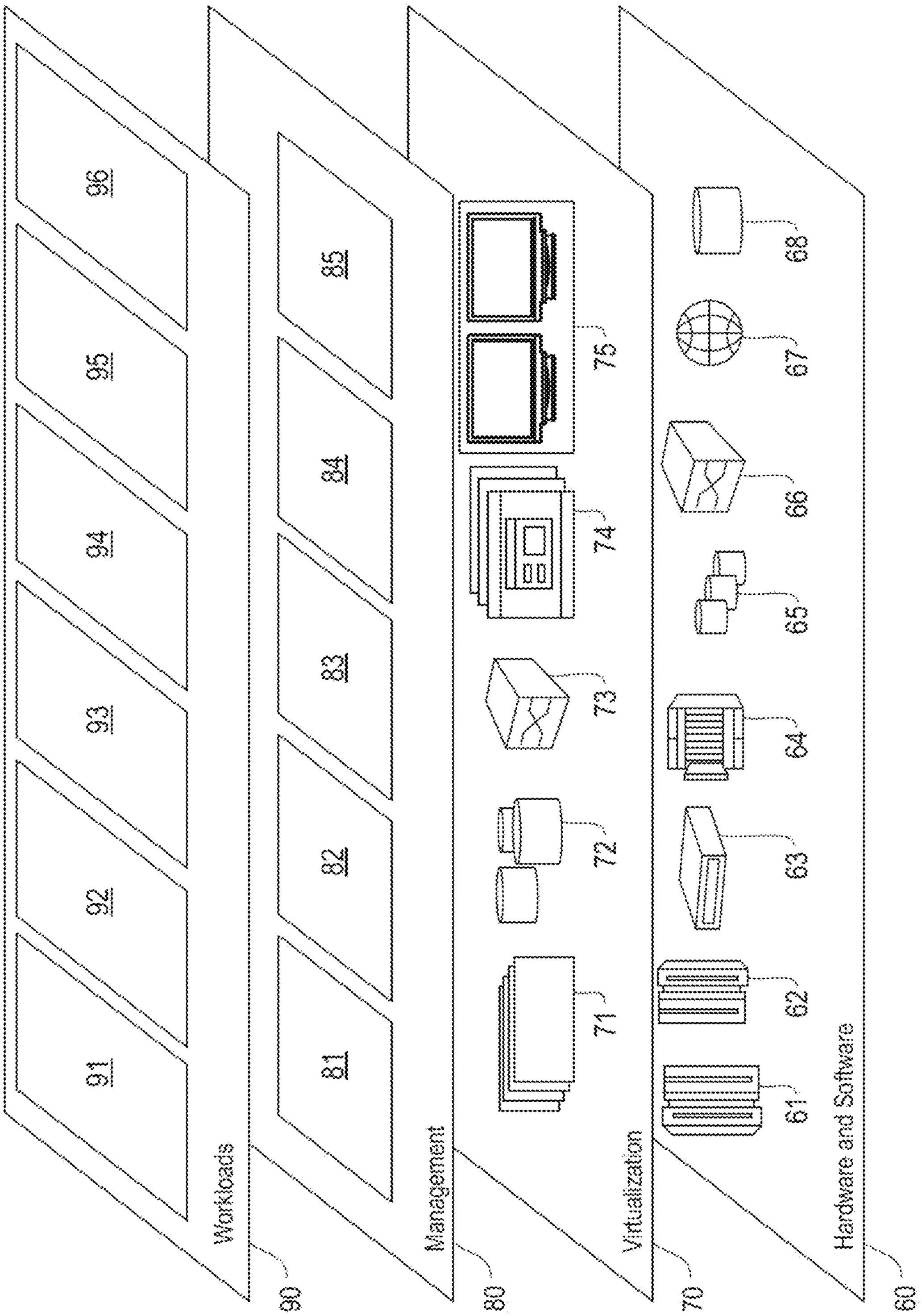
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and environmental impact aware product refurbishing 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improved machine learning techniques that automatically generate and select refurbishing options for unsold inventory while reducing the environmental impact.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

generating, using a machine learning framework, product embeddings of a plurality of products based on a first set of digital images of the plurality of products, wherein the machine learning framework comprises an encoder component that processes each image in the first set to encode attributes of the corresponding product within a vector embedding space such that one or more new product designs are generatable via vector operations performed within the vector embedding space, and wherein the product embeddings are jointly trained with location-specific demand data and location metadata to enable attribute-based, location-specific demand forecasting for the one or more new product designs;

performing one or more of the vector operations on the product embeddings to generate additional product embeddings within the vector embedding space, wherein the additional product embeddings represent the one or more new product designs;

generating, by a decoder component of the machine learning framework, a second set of digital images, wherein the decoder component constructs the second set of digital images by processing the additional product embeddings, wherein the second set of digital images correspond to the one or more new product designs for refurbishing each given one of the plurality of products, and wherein the additional product embeddings are based on an initial image of the given product and one or more design constraints associated with the given product;

calculating, by the machine learning framework, an environmental impact score and a demand impact score associated with each of the one or more new product designs, wherein the demand impact score is based at least in part on location-specific demand data, and wherein the environmental impact score is associated with at least one of the attributes of the corresponding product;

generating, by the machine learning framework, a recommendation to refurbish at least one of the plurality of products in accordance with at least one of the one or more new product designs based on the environmental impact scores and the demand impact scores, wherein generating the recommendation comprises executing a constraint-based selection process performed in the vector embedding space, and wherein the constraint-based selection process comprises iteratively checking for design constraint violations by:

(i) providing a candidate product embedding from the vector embedding space to the decoder component to generate a corresponding candidate digital image;

(ii) processing the candidate digital image using a product attribution network to obtain a set of candidate image attributes, and processing the initial image of the given product using the product attribution network to obtain a set of original product attributes; and (iii) processing the original product attributes and the candidate image attributes using a rule engine that applies a set of design rules to output a penalty score representing a distance metric between the candidate digital image and the initial image, wherein the set of design rules is based at least in part on the one or more design constraints, and wherein an attribute change that violates the one or more design constraints results in a higher penalty score than an attribute change that fulfills the one or more design constraints;

wherein the product attribution network is trained separately from the machine learning framework on a training objective directed to evaluating discrete product attributes of the candidate digital image, without consideration of the location-specific demand data or the location metadata; and outputting the recommendation and the generated digital image of the at least one of the one or more new product designs corresponding to the recommendation to a user;

wherein the method is carried out by at least one computing device.

2. The computer-implemented method of claim 1, wherein calculating the environmental impact score for a given one of the one or more new product designs is based on at least one of:

one or more materials associated with refurbishing the corresponding product to the given one of the one or more new product designs; and one or more manufacturing techniques associated with refurbishing the corresponding product to the given one of the one or more new product designs.

3. The computer-implemented method of claim 1, wherein calculating the demand impact score for a given one of the one or more new product designs is based on at least one of:

a predicted demand of the given one of the one or more new product designs; and a cost associated with the given one of the one or more new product designs.

4. The computer-implemented method of claim 1, comprising:

generating attribute-based, location-specific demand forecasts for the plurality of products using the jointly trained product embeddings, wherein the one or more new product designs are created based at least in part on the attribute-based, location-specific demand forecasts for the plurality of products.

5. The computer-implemented method of claim 1, wherein the generating comprises:

ranking the one or more new product designs for the plurality of products based on the environmental impact scores and the demand impact scores; and selecting a subset of the plurality of products to include in the recommendation based on the ranking.

6. The computer-implemented method of claim 1, wherein the machine learning framework comprises an autoencoder network comprising the decoder component and the encoder component.

7. The computer-implemented method of claim 6, wherein the autoencoder network comprises a generative adversarial network.

8. The computer-implemented method of claim 1, wherein the constraint-based selection process is performed at least in part by a population-based multi-objective search algorithm that searches the vector embedding space to jointly improve at least the environmental impact scores and the demand impact scores subject to the one or more design constraints, and wherein the population-based multi-objective search algorithm generates a ranked list of the one or more new product designs.

9. The computer-implemented method of claim 1, wherein calculating the demand impact score comprises:

processing the product embeddings, the location-specific demand data, and the location metadata using one or more deep sequential models trained jointly with the encoder component to generate location-specific demand forecasts.

10. A computer program product comprising a non-transitory computer readable storage medium having program instructions embodied therewith, the program instructions executable by a computing device to cause the computing device to:

generate, using a machine learning framework, product embeddings of a plurality of products based on a first set of digital images of the plurality of products, wherein the machine learning framework comprises an encoder component that processes each image in the first set to encode attributes of the corresponding product within a vector embedding space such that one or more new product designs are generatable via vector operations performed within the vector embedding space, and wherein the product embeddings are jointly trained with location-specific demand data and location metadata to enable attribute-based, location-specific demand forecasting for the one or more new product designs;

perform one or more of the vector operations on the product embeddings to generate additional product embeddings within the vector embedding space, wherein the additional product embeddings represent the one or more new product designs;

generate, by a decoder component of the machine learning framework, a second set of digital images, wherein the decoder component constructs the second set of digital images by processing the additional product embeddings, wherein the second set of digital images correspond to the one or more new product designs for refurbishing each given one of the plurality of products, and wherein the additional product embeddings are based on an initial image of the given product and one or more design constraints associated with the given product;

calculate, by the machine learning framework, an environmental impact score and a demand impact score associated with each of the one or more new product designs, wherein the demand impact score is based at least in part on location-specific demand data, and wherein the environmental impact score is associated with at least one of the attributes of the corresponding product;

generate, by the machine learning framework, a recommendation to refurbish at least one of the plurality of products in accordance with at least one of the one or more new product designs based on the environmental impact scores and the demand impact scores, wherein generating the recommendation comprises executing a constraint-based selection process performed in the vector embedding space, and wherein the constraint-based selection process comprises iteratively checking for design constraint violations by:

(i) providing a candidate product embedding from the vector embedding space to the decoder component to generate a corresponding candidate digital image;

(ii) processing the candidate digital image using a product attribution network to obtain a set of candidate image attributes, and processing the initial image of the given product using the product attribution network to obtain a set of original product attributes; and (iii) processing the original product attributes and the candidate image attributes using a rule engine that applies a set of design rules to output a penalty score representing a distance metric between the candidate digital image and the initial image, wherein the set of design rules is based at least in part on the one or more design constraints, and wherein an attribute change that violates the one or more design constraints results in a higher penalty score than an attribute change that fulfills the one or more design constraints;

wherein the product attribution network is trained separately from the machine learning framework on a training objective directed to evaluating discrete product attributes of the candidate digital image, without consideration of the location-specific demand data or the location metadata; and output the recommendation and the generated digital image of the at least one of the one or more new product designs corresponding to the recommendation to a user.

11. The computer program product of claim 10, wherein calculating the environmental impact score for a given one of the one or more new product designs is based on at least one of:

one or more materials associated with refurbishing the corresponding product to the given one of the one or more new product designs; and one or more manufacturing techniques associated with refurbishing the corresponding product to the given one of the one or more new product designs.

12. The computer program product of claim 10, wherein calculating the demand impact score for a given one of the one or more new product designs is based on at least one of:

a predicted demand of the given one of the one or more new product designs; and a cost associated with the given one of the one or more new product designs.

13. The computer program product of claim 10, wherein the program instructions cause the computing device to:

generate attribute-based, location-specific demand forecasts for the plurality of products using the jointly trained product embeddings, wherein the one or more new product designs are created based at least in part on the attribute-based, location-specific demand forecasts for the plurality of products.

14. The computer program product of claim 10, wherein the generating comprises:

ranking the one or more new product designs for the plurality of products based on the environmental impact scores and the demand impact scores; and selecting a subset of the plurality of products to include in the recommendation based on the ranking.

15. The computer program product of claim 10, wherein the machine learning framework comprises an autoencoder network comprising the decoder component and the encoder component.

16. The computer program product of claim 15, wherein the autoencoder network comprises a generative adversarial network.

17. A system comprising:

a memory configured to store program instructions;

a processor operatively coupled to the memory to execute the program instructions to:

generate, using a machine learning framework, product embeddings of a plurality of products based on a first set of digital images of the plurality of products, wherein the machine learning framework comprises an encoder component that processes each image in the first set to encode attributes of the corresponding product within a vector embedding space such that one or more new product designs are generatable via vector operations performed within the vector embedding space, and wherein the product embeddings are jointly trained with location-specific demand data and location metadata to enable attribute-based, location-specific demand forecasting for the one or more new product designs;

perform one or more of the vector operations on the product embeddings to generate additional product embeddings within the vector embedding space, wherein the additional product embeddings represent the one or more new product designs;

generate, by a decoder component of the machine learning framework, a second set of digital images, wherein the decoder component constructs the second set of digital images by processing the additional product embeddings, wherein the second set of digital images correspond to the one or more new product designs for refurbishing each given one of the plurality of products, and wherein the additional product embeddings are based on an initial image of the given product and one or more design constraints associated with the given product;

calculate, by the machine learning framework, an environmental impact score and a demand impact score associated with each of the one or more new product designs, wherein the demand impact score is based at least in part on location-specific demand data, and wherein the environmental impact score is associated with at least one of the attributes of the corresponding product;

generate, by the machine learning framework, a recommendation to refurbish at least one of the plurality of products in accordance with at least one of the one or more new product designs based on the environmental impact scores and the demand impact scores, wherein generating the recommendation comprises executing a constraint-based selection process performed in the vector embedding space, and wherein the constraint-based selection process comprises iteratively checking for design constraint violations by:

(i) providing a candidate product embedding from the vector embedding space to the decoder component to generate a corresponding candidate digital image;

(ii) processing the candidate digital image using a product attribution network to obtain a set of candidate image attributes, and processing the initial image of the given product using the product attribution network to obtain a set of original product attributes; and (iii) processing the original product attributes and the candidate image attributes using a rule engine that applies a set of design rules to output a penalty score representing a distance metric between the candidate digital image and the initial image, wherein the set of design rules is based at least in part on the one or more design constraints, and wherein an attribute change that violates the one or more design constraints results in a higher penalty score than an attribute change that fulfills the one or more design constraints;

wherein the product attribution network is trained separately from the machine learning framework on a training objective directed to evaluating discrete product attributes of the candidate digital image, without consideration of the location-specific demand data or the location metadata; and output the recommendation and the generated digital image of the at least one of the one or more new product designs corresponding to the recommendation to a user.

18. The system of claim 17, wherein calculating the environmental impact score for a given one of the one or more new product designs is based on at least one of:

one or more materials associated with refurbishing the corresponding product to the given one of the one or more new product designs; and one or more manufacturing techniques associated with refurbishing the corresponding product to the given one of the one or more new product designs.

19. The system of claim 17, wherein calculating the demand impact score for a given one of the one or more new product designs is based on at least one of:

a predicted demand of the given one of the one or more new product designs; and a cost associated with the given one of the one or more new product designs.

20. The system of claim 17, wherein the processor is operatively coupled to the memory to further execute the program instructions to:

generate attribute-based, location-specific demand forecasts for the plurality of products using the jointly trained product embeddings, wherein the one or more new product designs are created based at least in part on the attribute-based, location-specific demand forecasts for the plurality of products.

* * * * *